United States Patent
Bourdelais et al.

(10) Patent No.: US 7,058,272 B2
(45) Date of Patent: Jun. 6, 2006

(54) WAVE-GUIDED OPTICAL INDICATOR

(75) Inventors: Robert P. Bourdelais, Pittsford, NY (US); Cheryl J. Brickey, Webster, NY (US); Wen-Li A. Chen, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 37 days.

(21) Appl. No.: 10/747,604

(22) Filed: Dec. 29, 2003

(65) Prior Publication Data
US 2005/0147372 A1 Jul. 7, 2005

(51) Int. Cl.
*G02B 6/10* (2006.01)

(52) U.S. Cl. .................. 385/129; 385/12; 264/1.24; 340/815.42; 116/202; 235/227.23

(58) Field of Classification Search .............. 385/12, 385/13, 25, 43, 129, 133, 146; 264/1.24–1.29; 359/598; 340/815.42; 362/551–582; 116/202; 235/473; 257/227.23
See application file for complete search history.

(56) References Cited

U.S. PATENT DOCUMENTS

| 3,501,301 A | 3/1970 | Nadeau et al. |
| 4,387,374 A | 6/1983 | Wiener |
| 4,420,607 A | 12/1983 | Morris et al. |
| 4,459,402 A | 7/1984 | Morris et al. |
| 4,468,510 A | 8/1984 | Morris et al. |
| 4,953,933 A | 9/1990 | Asmar |
| 5,225,166 A | 7/1993 | Zarian et al. |
| 5,324,933 A * | 6/1994 | Berkcan ............... 250/227.23 |
| 5,639,589 A | 6/1997 | Bauer et al. |
| 5,853,965 A | 12/1998 | Haydock et al. |
| 5,995,690 A * | 11/1999 | Kotz et al. .................. 385/25 |
| 6,201,239 B1 | 3/2001 | Yamamoto et al. |

* cited by examiner

*Primary Examiner*—Phan Palmer
(74) *Attorney, Agent, or Firm*—Paul A. Leipold

(57) ABSTRACT

The invention relates to an indicator comprising a light-guiding layer, a cladding layer on one surface of said light-guiding layer, and a patterning layer on the other surface.

37 Claims, 1 Drawing Sheet

WAVE-GUIDED OPTICAL INDICATOR

FIELD OF THE INVENTION

This invention relates to the formation of an indicator element containing a light guiding layer, cladding, and a patterning layer for a timing device.

BACKGROUND OF THE INVENTION

Indicator elements or timing elements allow devices such as ink jet print heads to be accurately positioned in space. In general, timing control elements are either rotatable about a central axis, i.e., timing disk, or are movable in a linear direction, i.e., timing rule. Light, projected by a transmitter, passes through the control element, and is intercepted by the receiver. The receiver, responsive to the light, converts the light into an electrical signal capable of controlling machinery and other servo-mechanical devices.

Timing control elements typically are encoded with a selected window pattern, i.e., they have an annular or linear array of windows that alternate in a transparent window, opaque window, transparent window, opaque window pattern. While the transparent window openings allow the transmitted light to pass through the timing disk or rule, the opaque windows prevent the light from passing through the timing disk or rule.

Timing disks as a rule are fixed to a rotating shaft by means of a hub. For linear systems, timing rules are arranged at right angles to a source of light and the associated receiver generates an electrical signal in response to the incoming light. This particular application is used, for example, to control the feeding action of machine tools.

As the timing disk rotates or the timing rule moves in a linear direction, light is directed at the selected window pattern. Because of the window pattern, the transmitted light can only pass through a transparent window. In response to the light, the receiver generates an electrical signal.

The electrical signals serve to establish a control surface for the measurement of rotational speed, acceleration and more accurate positioning of servomechanical elements, as for example a printing head, a robot arm or a tool carrier.

Timing control elements can be made of glass, metal or plastic, however, plastic and metal are typically used in mass production applications. They are produced, for example, in the case of angle indicators or encoding units, e.g. ink jet printers, out of transparent films.

Known timing devices utilize an arrangement whereby the transmitter is placed on one side of the timing structure and the receiver is placed on the other side of the timing structure to capture the light as it passes through the disk. This arrangement has been known to cause a number of problems, including: a requirement for a complex electromechanical apparatus, increased mechanical stress caused by oscillating loads, a larger footprint size for the timing device, and dirt forming on the timing structure, thereby preventing light from passing efficiently through the structure.

U.S. Pat. No. 4,387,374 (Wiener) discloses a timing device in which the indicator device is an operator rotatable cylindrically shaped encoder wheel with longitudinal slits. LED's are used as the light source on the outside of the cylinder and the detector is on the inside of the cylinder and receives light as the cylinder spins and lets light into the center of the cylinder through the slits. While this arrangement allows the timing device to be made smaller, it would be beneficial to decouple the light source from the detector, making the system more flexible.

U.S. Pat. No. 4,953,933 (Asmar) discloses the use of optical fibers or light guides that function as a read-head for such optical position encoders delivering light to a detector to form a timing device. Although decoupling the light source from the detector saves space and allows the timing devices to be used in different applications, the optical fibers placement would be have to be extremely precise in order to deliver a clear signal to the detector resulting in a very complex and expensive timing device.

U.S. Pat. No. 6,201,239 (Yamamoto et al.) discloses an optical encoder that has a surface emitting semiconductor laser as a light source, a movable scale, and a detector. The object of the invention was to provide an optical encoder using a surface emitting laser, wherein when the light source and the scale (patterned) are situated relatively close to each other, such that the scale pitch can be made less than that in a conventional optical encoder. While this reduces the size of the timing device enabling the movable patterned scale and the light source to be close in proximity, the light source and the patterning layer are two separate layers and must be very precisely aligned, increasing the complexity of the timing device. It would be beneficial to be able to decouple the light source and the patterning layer, making the indicator device capable of more flexible setup positions for a variety of different applications and be smaller.

PROBLEM TO BE SOLVED BY THE INVENTION

There remains a need for an encoder element system that takes up less space and can be arranged to fit within the confines of various devices.

SUMMARY OF THE INVENTION

It is an object of the invention to overcome disadvantages of prior indicator elements.

It is another object to provide an encoder element system that takes up less space and can be arranged to fit within the confines of various devices.

These and other objects of the invention are accomplished by an indicator comprising a light-guiding layer, a cladding layer on one surface of said light-guiding layer, and a patterning layer on the other surface.

ADVANTAGEOUS EFFECT OF THE INVENTION

The invention provides an indicator device with an indicator that waveguides light so that the detector and the light source may be flexible in placement, so that the entire positioning device can be rearranged in many different configurations. Further the invention provides a double-sided timing device for increased accuracy.

DETAILED DESCRIPTION OF THE INVENTION

The invention has numerous advantages over the prior art. The invention provides an indicator element that uses wave-guided light as its light source. This eliminates the need for the detector and light source to be on opposite sides of the indicator element (as in a transparent indicator) or on the same side of the indicator element side by side (as in a reflective indicator). Having the light wave-guided to the indicator element decouples the light source and the detector so that the entire positioning device can be rearranged in many different configurations to fit in a wide variety of applications.

The invention also provides a timing device that contains positioning information on both the front and back side of the timing device. Timing information on both the front and back sides provides a significant increase in the amount of positioning information compared to single sided timing devices. Two sides timing devices save space, allowing the same device to have more information and can provide timing redundancy for critical applications such as military aircraft or elevators, were the failure of a timing device could result in the loss of equipment or human life. These and other advantages will be apparent from the detailed description below.

The term as used herein, "transparent" means the ability to pass radiation without significant deviation or absorption. For this invention, "transparent" material is defined as a material that has a spectral transmission greater than 85%. For an element, spectral transmission is the ratio of the transmitted power to the incident power and is expressed as a percentage as follows: $T_{RGB}=10^{-D}*100$ where D is the average of the red, green and blue Status A transmission density response of the processed minimum density of the photographic element as measured by an X-Rite model 310 (or comparable) photographic transmission densitometer.

The term "light" means visible light. The term "total light transmission" means percentage light transmitted through the sample at 500 nm as compared to the total amount of light at 500 nm of the light source. This includes both spectral and diffuse transmission of light. The term "polymeric film" means a film comprising polymers. The term "polymer" means homo- and co-polymers.

Figure 1:
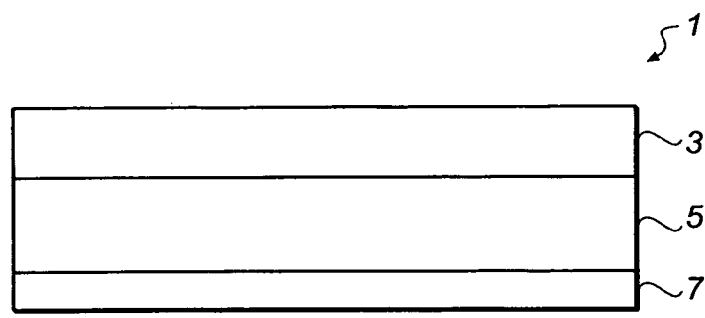
FIG. 1 shows an indicator element with a patterning layer, a light guiding layer, and a cladding layer.

FIG. 1 shows an indicator element 1, a patterning layer 3, a light guiding layer 5, and a cladding layer 7. The light guiding layer 5 on one side has a cladding layer 7 applied and on the side of the light guiding layer 5 opposite to the cladding layer 7, there is a patterning layer 3.

The thickness of the light guiding layer at least 100 micrometers thick. When the light guiding layer is less than 90 micrometers in thickness it becomes difficult to align a wave-guided light source to the layer and misalignment can occur. Furthermore, it is preferred for the light guiding layer to be at least 100 micrometers thick to give rigidity and structural integrity to the indicator element. If the light guiding layer is too thin, the indictor element may bend or curl and the detector would not be able to function properly. When the light management film is over 250 micrometers thick, the efficiency of the light guiding layer for wave-guiding light is diminished and the indicator element becomes more difficult to convey through printing apparatuses. Further, by reducing the thickness of the light management film, the materials content of the indicator elements are reduced. When the light management film is 100 to 250 micrometers thick, it is easy to handle, has stability, and can be processed easily through a printing apparatus to create the patterned layer.

The light guiding layer preferably comprises a thermoplastic polymer. Thermoplastic polymers are typically inexpensive, easily processable, and can have high transmission values. Suitable classes of thermoplastic polymers for the transparent polymeric film include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers can be used.

Polyolefins particularly polypropylene, polyethylene, polymethylpentene, and mixtures thereof are preferred. Polyolefin copolymers, including copolymers of propylene and ethylene such as hexene, butene and octene are also preferred. Polypropylenes are most preferred because they are low in cost and have good strength and surface properties.

Polyester is preferred because it is low in cost, has excellent smoothness and is tough compared to polymers such as polyolefin. Preferred polyesters for the transparent polymeric film dicarboxylic acids of 4–20 carbon atoms and aliphatic or alicyclic useful in the invention include those produced isophthalic, phthalic, naphthalene dicarboxylic acid, succinic, glutaric, from aromatic, aliphatic or cycloaliphatic glycols having from 2–24 carbon atoms. Examples of suitable dicarboxylic acids include terephthalic, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well known techniques, e.g., those described in U.S. Pat. Nos. 2,465,319 and 2,901,466. Preferred polyesters are those having repeat units from terephthalic acid or naphthalene dicarboxylic acid and at least one glycol selected from ethylene glycol, 1,4-butanediol and 1,4-cyclohexanedimethanol. Poly(ethylene terephthalate), which may be modified by small amounts of other monomers, is especially preferred. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607, 4,459,402 and 4,468,510.

In another preferred embodiment, the polymer layers of the invention are selected from a group consisting of cellulose triacetate, polyethylenenapthalate, and polycarbonate. Cellulose triacetate is preferred because of the low birefringence and excellent adhesion for other useful layers. Low birefringence is preferred because it reduces noise in the source/receiver system used for timing devices. The optical anisotropy or birefringence is expressed by the product of the film thickness d and the birefringence $\Delta n$ which is a difference between the refractive index in the slow optic axis direction and the refractive index in the fast optic axis direction in the plane of the film, i.e. $\Delta n*d$ (retardation). The orientation direction coincides with the drawing axis in the film of the present invention. The drawing axis is the direction of the slow optic axis in the case of a thermoplastic polymer having a positive intrinsic birefringence and is the direction of the fast optic axis for a thermoplastic polymer having a negative intrinsic birefringence. There is no definite requirement for the necessary level of the value of Δn.*d since the level depends upon the application of the polymer layer and the desired signal to noise ratio.

Polycarbonate is preferred because of the high light transmission and excellent mechanical properties. Polycarbonate, while having a birefringence higher than cellulose triacetate, is relative low compared to other crystalline polymers. Polyethylenenapthalate is preferred because of the high index of refraction, which is typically in the range of 1.75 to 1.85 (depending on the extent of orientation). High index of refraction improves the light directing efficiency of the invention allowing more light to be focused toward a detector.

In particular, one suitable light guiding layer material includes a 1:1 mixture by weight of n-butyl methacrylate and 2-ethylhexyl methacrylate, which, in turn, can contain 0.05% by weight triethylene glycol dimethacrylate crosslinking agent and 0.2% by weight di(4-t-butylcyclohexyl)peroxydicarbonate (Perkadox 16.TM., Akzo Nobel Chemicals, Inc., Chicago, Ill.) thermal initiator. Additional materials and examples are presented in U.S. Pat. No. 5,225,166, incorporated herein by reference.

The patterning layer controls where the light exits the indicator to be received by the detector. The patterning layer is typically formed using a silver halide, thermal dye transfer, inkjet, or any other printing method. Usually the pattern is usually a series of lines, similar to a barcode, but usually with the lines and spaces of equal thickness and spacing. The patterning layer contains areas that let light out of the indicator and areas that either block and absorb the light or reflect the light to keep the light in the light guiding layer. Preferably, the patterning layer comprises generally opaque colorant areas and areas without colorant. The colorant could be any color, including a neutral or black. This forms the areas that light exits and does not exit the indicator element to reach the detector.

The indicator element comprises a cladding layer that is designed to keep the light in the light guiding layer so that it exits out only through the patterned layer so that it can be detected by the detector.

A variety of materials can be used to form the cladding. Polymers are preferred as they are cheap and easily processable. As an example, fluoropolymers have been found to be useful as a cladding for the light guiding layer. The plastic cladding surrounds the light guiding layer and has an index of refraction that is less than the index of refraction of the light guiding layer. Such an arrangement typically results in substantial internal reflection of light traveling through the light guiding layer. The internal reflection of light occurs when light traveling down the light guiding layer is reflected back towards the center of the light guiding layer as the light encounters the inner surface of the cladding. The efficiency of the optical waveguide decreases if the cladding layer has an index of refraction smaller than the light guiding layer by less than 0.03. Preferably, the cladding layer index of refraction is at least 0.1 less than the index of refraction of the light guiding layer, this ensures an efficient waveguide with little light lost out of the cladding layer. Examples of suitable fluoropolymer include Teflon-100® fluorinated ethylene polymer (DuPont Chemicals Co. Fluoropolymer Division, Wilmington, Del.), Teflon® poly(tetrafluoroethylene) (PTFE) (DuPont), a terpolymer of tetrafluoroethylene, hexafluoropropylene, and vinylidene fluoride, available from Dyneon, Inc., St. Paul, Minn. or other similar commercially-available highly fluorinated polymeric material.

Preferably, the cladding layer is a reflective layer. Having a reflective layer (such as metal) surrounding the light guiding layer acts like a mirror and keeps most of the light in the light guiding layer making a very efficient light guide. Preferably, the reflective cladding layer is at least 90% reflective to 500 nanometer light, this insures that most of the light is contained in the light guiding layer and is not lost out the reflective layer.

In a preferred embodiment, the cladding layer comprises a metal. Metal layers thin, have high reflectivity and can be patterned by such methods as laser ablation. The adhesion of a metallic layer to paper or polymer is difficult and therefore the choice of material for adhesion is important to assure proper functionality of the final element. The metallic layer may either be chemically primed to promote adhesion or coated with a heat or pressure sensitive adhesive. The metal or metallized layer can comprise at least one material from the following list of aluminum, nickel, steel, gold, zinc, copper, titanium, metallic alloys as well as inorganic compounds such as silicon oxides, silicon nitrides, aluminum oxides or titanium oxides. The most preferred metal layer comprises silver. Metallic silver has been shown to have over 95% reflectivity between 350 and 750 nm. Further, metallic silver has a low level of interaction with the silver halide imaging layers compared to metals that contain high amounts of iron. Finally, silver has a low oxidation rate and thus remains highly reflective over the lifetime of a typical timing.

The metal cladding preferably has a specular reflectivity of between 65 and 99.5%, more preferably between 95 and 99.2%. High specular reflectivity improves the signal to noise ratio and also allows lower power emitters to be utilized saving energy and lowering cost. Metallic silver has been found to provide specular reflectivity between 95 and 99.2%. The metal cladding layer typically has a metal thickness between 500 and 5000 angstroms, more preferably between 800 and 1500 angstroms. Metal layers with a thickness less than 400 angstroms do not provide the desired reflectivity since greater than 20% of the source light is transmitted through the base. Above 5000 angstroms, little improvement in reflectivity is observed and therefore not cost justified. Metallic cladding layers between 800 and 1500 angstroms have been found to provide excellent specular reflection and low pinhole counts.

A preferred encoder comprises a disk encoder. A disk encoder is radial and thus uses space very efficiently. To produce a disk encoder, the printed and processed material of the invention may be die cut to the desired shape. The die cut disk may also be laminated to a stiffening member to further improve the flatness of the material of the invention.

Figure 2:
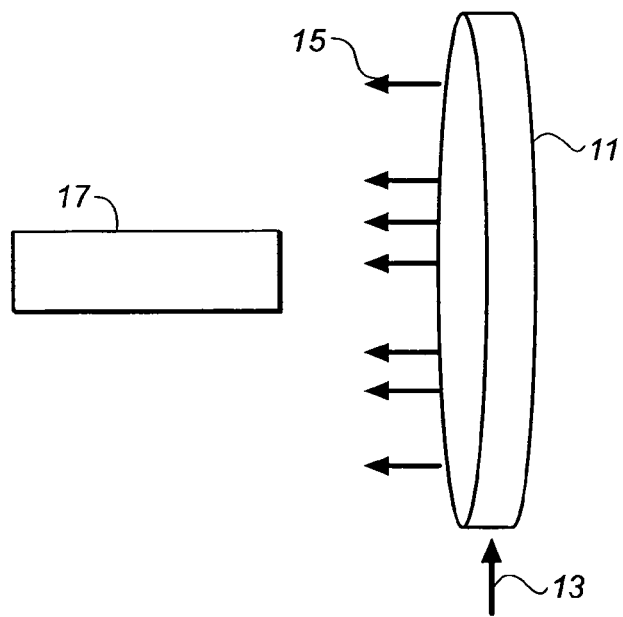
FIG. 2 shows an indicator element with a light input and a detector.

FIG. 2 shows a system with a disk indicator element 11, a light 13, and a detector 17. The indicator element 11 is a disk type that rotates along its circumference like a record player. Light 13 is applied to the indicator element 11 at the edge of the indicator element. The light is waveguided through the indicator element and exits through the patterned layer to emerge as light exiting the indicator 15. The light exits in a pattern corresponding to the pattern in the patterning layer. The detector 17 then detects the light.

In another preferred embodiment the indicator is in the form of a strip. A strip indicator element is useful for positioning for movement in a linear motion. The strip encoder is produced similar to a disk encoder Preferably, the indicator device moves relative to the detector. For example, if the indicator element was a disk, the disk would be spinning and the detector would be stationary. This configuration is preferred because it is a simple setup that is most often used in the industry. In another embodiment, the detector moves relative to the indicator device. This setup can be employed when there are space constraints that do not allow the indicator element to move.

Preferably the timing device has a shield that allows the detector to only receive light from a small portion of the indicator device. This shield can be used to mask most of the indicator device so that only the detector detects a small portion of the surface of the indicator device. One embodiment of this shield could be a cone that fits onto the detector such that the small end of the cone with a little hole in it faces the sample. This limits the light coming off of the indicator element away from the area to be measured reaching the detector. This shield could also be an aperture control on the detector to shield light except for a narrow viewing angle, to have the detector only detect a small surface area of the indicator device. This shield preferably has a one degree cone to a 10 degree cone meaning the detector will only see light that enters the shield in 1 to 10 degrees off axis, depending on the cone angle selected.

The indicator element in one embodiment is provided with light focusing or shaping lenses. These lenses can be found on the detector or on or in any of the layers of the indicator device but are most preferably found on the outer surface of the patterning layer. The light shaping elements may be applied to the patterning layer before or after printing or can actually be part of the patterning layer. The light focusing structures can intensify the light emitted in the normal direction from the light-emitting surface towards the detector. This leads to more light reaching the detector and less light reaching the detector from high angles. This increased brightness results in more accuracy of the detector, or can be used to lower the light output of the light emissive element and saving energy.

These light shaping elements can be a lens array or a linear array of prismatic structures. The prismatic film is a film having a plurality of prismatic ridges that are provided in parallel with each other along one direction. The prism angle (an angle of the apex of each ridge) of the prismatic film is usually between 70 and 120 degrees, preferably between 80 and 100 degrees. When the prism angle is too small, the observation angle tends to be narrow. When the prism angle is too large, the effects for increasing the luminance may deteriorate.

The distance between apexes of adjacent prisms (prism pitch) is usually between 10 and 400 mm, preferably between 20 and 100 mm. When the prism pitch is too small, the observation angle tends to decrease. When the prism pitch is too large, the effects for increasing the luminance may deteriorate. The light directing features can be a linear array of prisms with pointed, blunted, or rounded tops.

They can also be made up of individual optical elements that can be, for example, sections of a sphere, prisms, pyramids, and cubes. The optical elements can be random or ordered, and independent or overlapping. The sides can be sloped, curved, or straight or any combination of the three.

Figure 3:
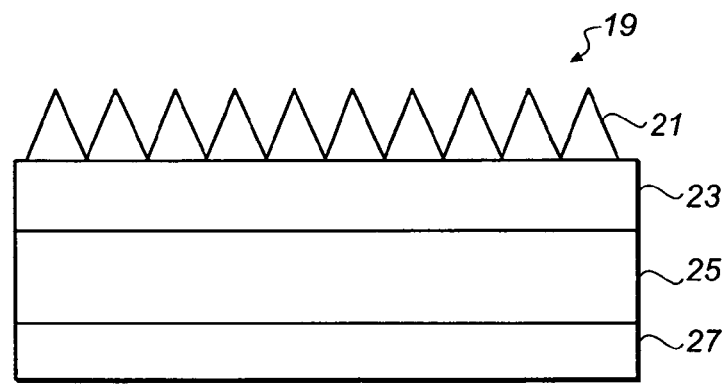
FIG. 3 shows an indicator element with light shaping elements, a patterning layer, a light guiding layer, and a cladding layer.

FIG. 3 shows an indicator element 19 with light shaping elements 21, a patterning layer 23, a light guiding layer 25, and a cladding layer 27. The light guiding layer 25 on one side has a cladding layer 27 applied and on the side of the light guiding layer 25 opposite to the cladding layer 27, there is a patterning layer 23. On top of the patterning layer are light shaping elements 21.

The indicator is preferably arcuate in shape to that it can fit to the contour of an object to be timed. For example, a rotary shaft could use an indicator element in an arcuate shape.

In another preferred embodiment, the indicator element is tubular in shape so that it can fit around the contour of an object to be timed. For example, a rotary shaft could use an indicator element in a tubular shape so that the indicator element surrounds the rotary shaft.

The patterning layer can be formed of any material that can be patterned. For example, thermal dye transfer, inkjet, silver halide, gravure printing, laser ablation and many other techniques can be used to form the patterning layer.

Silver halide imaging layers are preferred to form the patterning layer because they provide excellent sharpness, fine resolution of the indicator lines and can be written from a digital file. A silver halide emulsion capable of forming black and white indicator patterns having a density greater than 2.5 is preferred. A density greater than 2.5 allows for an improvement in the signal to noise ratio. Further, the higher the density, the higher the contrast between the reflective areas of the timing device and the high density areas of the timing device. A high contrast ratio allows for improving information density thus reducing the size of the timing device or increasing the amount of information on the timing device. A high density black and white emulsion is formed by increasing the amount of silver halide in the emulsion and as the latent image is converted to metallic silver, the density of the indicator lines increases.

The silver halide imaging layer(s) of the invention provides high contrast between the exposed areas and unexposed areas increasing the signal to noise ratio compared to ink printed indicator lines. Further, the high contrast silver halide imaging layers can be digitally written with a laser exposing device allowing for sharp indicator lines and customization of the timing devices.

A silver halide emulsion capable of forming high contrast is preferred. High contrast improves signal to noise ratio and allows for higher information density. Indicator line density is related to the log exposure range. The preferred log exposure range for the light sensitive silver halide imaging layers of the invention are between 0.51 and 0.95. This log exposure range has been shown to provide the desired contrast for common emitters and detectors utilized for timing devices.

To improve the signal to noise ratio of the indicator element, silver halide imaging layers containing high transparency gelatin are preferred. High transparency gelatin allows source light energy to efficiently be transmitted through the density minimum areas of the indicator pattern and be reflected back through the gelatin toward the detector. A gelatin having a transparency of greater than 94% measured in a 25 micrometer layer is preferred. In order to have high transparency, pig gelatin is preferred. Pig gelatin is known to have higher transparency that typical, lower cost cow gelatin and does improve the signal to noise ratio compared to cow gelatin. Further, pig gelatin tends to have lower gel strength and thus will curl less at lower humidity further reducing signal to noise ratio of a timing device.

In the following discussion of suitable materials for use in elements of this invention, reference will be made to Research Disclosure, September 1994, Number 365, Item 36544, which will be identified hereafter by the term "Research Disclosure I." The Sections hereafter referred to are Sections of the Research Disclosure I unless otherwise indicated. All Research Disclosures referenced are published by Kenneth Mason Publications, Ltd., Dudley Annex, 12a North Street, Emsworth, Hampshire P010 7DQ, ENGLAND. The foregoing references and all other references cited in this application, are incorporated herein by reference.

Suitable silver halide emulsions and their preparation as well as methods of chemical and spectral sensitization are described in Sections I through V. Vehicles which can be used in the photographic elements are described in Section II, and various additives such as brighteners, antifoggants, stabilizers, light absorbing and scattering materials, hardeners, coating aids, plasticizers, lubricants and matting agents are described, for example, in Sections VI through XIII. Manufacturing methods are described in all of the sections. A typical photographic element of the invention comprises a transparent support, a layer containing the dispersed filter dye adjacent the support, a light sensitive silver halide emulsion layer over the filter dye layer and a protective overcoat top layer. The layer containing the filter dye can be an antihalation layer. In other embodiments of the invention the silver halide emulsion layer is on one side of the support and the filter dye layer is on the opposite side of the support, for example, in the pelloid layer. Processing methods and agents in Sections XIX and XX.

In preferred embodiments of the invention, the photographic element contains a negative working silver halide emulsion and a negative image can be formed.

The photographic elements may also contain materials that accelerate or otherwise modify the processing steps of bleaching or fixing to improve the quality of the image. Bleach accelerators described in EP 193 389; EP 301 477; U.S. Pat. Nos. 4,163,669; 4,865,956; and 4,923,784 are particularly useful. Also contemplated is the use of nucleating agents, development accelerators or their precursors (UK Patent 2,097,140; U.K. Patent 2,131,188); electron transfer agents (U.S. Pat. Nos. 4,859,578; 4,912,025); antifogging agents such as derivatives of hydroquinones, aminophenols, amines, gallic acid; catechol; ascorbic acid; hydrazides; sulfonamidophenols.

The silver halide used in the photographic elements may be silver iodobromide, silver bromide, silver chloride, silver chlorobromide, silver chloroiodobromide, and the like. Further, the high contrast silver halide imaging layers may comprise a combination of yellow, magenta and cyan dyes to for black. Silver chloride is preferred because it can be easily processed and forms high density.

The type of silver halide grains preferably include polymorphic, cubic, and octahedral. The grain size of the silver halide may have any distribution known to be useful in photographic compositions, and may be either polydipersed or monodispersed.

The silver halide grains to be used in the invention may be prepared according to methods known in the art, such as those described in Research Disclosure I and James, The Theory of the Photographic Process. These include methods such as ammoniacal emulsion making, neutral or acidic emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation.

Dopants can be employed to modify grain structure and properties as disclosed in Research Disclosure I section I-C(3) and Research Disclosure, Item 3736, November 1994. Typical dopants include Periods 3–7 ions including Group VIII metal ions (Fe, Co, Ni and the platinum metals, Ru, Rh, Pd, Re, Os, Ir and Pt), Mg, Al, Ca, Sc, Ti, V, Cr, Mn, Cu, Zn, Ga, As, Se, Sr, Y, Mo, Zr, Nb, Cd, In, Sn, Sb, Ba, La, W, Au, Hg, Tl, Pb, Bi, Ce and U. The dopants can be introduced during the precipitation step during the formation of the silver halide grains.

The silver halide to be used in the invention may be advantageously subjected to chemical sensitization with noble metal (for example, gold) sensitizers, middle chalcogen (for example, sulfur) sensitizers, reduction sensitizers and others known in the art. Compounds and techniques useful for chemical sensitization of silver halide are known in the art and described in Research Disclosure I and the references cited therein.

The photographic elements of the present invention, as is typical, provide the silver halide in the form of an emulsion. Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like), and others as described in Research Disclosure I. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in Research Disclosure I. The vehicle can be present in the emulsion in any amount useful in photographic emulsions. The emulsion can also include any of the addenda known to be useful in photographic emulsions. These include chemical sensitizers, such as active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 5 to 8, and temperatures of from 30 to 80.degree. C., as described in Research Disclosure I, Section IV (pages 510–511) and the references cited therein.

The silver halide may be sensitized by sensitizing dyes by any method known in the art, such as described in Research Disclosure I. The dye may be added to an emulsion of the silver halide grains and a hydrophilic colloid at any time prior to (e.g., during or after chemical sensitization) or simultaneous with the coating of the emulsion on a photographic element. The dyes may, for example, be added as a solution in water or an alcohol. The dye/silver halide emulsion may be mixed with a dispersion of color image-forming coupler immediately before coating or in advance of coating (for example, 2 hours).

Photographic elements of the present invention are preferably imagewise exposed from a stored image (such as a computer stored image) by means of light emitting devices (such as light emitting diodes, lasers, CRTs and the like).

Photographic elements of the invention can be processed in any of a number of well-known photographic processes utilizing any of a number of well-known processing compositions, described, for example, in Research Disclosure I, or in T. H. James, editor, The Theory of the Photographic Process, 4th Edition, Macmillan, New York, 1977. Development of the indicator patterns is followed by fixing, washing and drying.

Preferably, a thermal printer forms the patterning layer. Thermal printing produces good image quality. The thermal dye image-receiving layer of the receiving elements of the invention may comprise polymers or mixtures of polymers that provide sufficient dye density, printing efficiency and high quality images. For example, polycarbonate, polyurethane, polyester, polyvinyl chloride, poly(styrene-co-acrylonitrile), poly(caprolactone), polylatic acid, saturated polyester resins, polyacrylate resins, poly(vinyl chloride-co-vinylidene chloride), chlorinated polypropylene, poly(vinyl chloride-co-vinyl acetate), poly(vinyl chloride-co-vinyl acetate-co-maleic anhydride), ethyl cellulose, nitrocellulose, poly(acrylic acid) esters, linseed oil-modified alkyd resins, rosin-modified alkyd resins, phenol-modified alkyd resins, phenolic resins, maleic acid resins, vinyl polymers, such as polystyrene and polyvinyltoluene or copolymer of vinyl polymers with methacrylates or acrylates, poly(tetrafluoroethylene-hexafluoropropylene), low-molecular weight polyethylene, phenol-modified pentaerythritol esters, poly(styrene-co-indene-co-acrylonitrile), poly(styrene-co-indene), poly(styrene-co-acrylonitrile), poly(styrene-co-butadiene), poly(stearyl methacrylate) blended with poly(methyl methacrylate). Among them, a mixture of a polyester resin and a vinyl chloridevinyl acetate copolymer is preferred, with the mixing ratio of the polyester resin and the vinyl chloride-vinyl acetate copolymer being preferably 50 to 200 parts by weight per 100 parts by weight of the polyester resin. By use of a mixture of a polyester resin and a vinyl chloride-vinyl acetate copolymer, light resistance of the image formed by transfer on the image-receiving layer can be improved.

The dye image-receiving layer may be present in any amount that is effective for the intended purpose. In general, good results have been obtained at a concentration of from about 1 to about 10 g/m². An overcoat layer may be further coated over the dye-receiving layer, such as described in U.S. Pat. No. 4,775,657 of Harrison et al.

Dye-donor elements that are used with the dye-receiving element of the invention conventionally comprise a support having thereon a dye containing layer. Any dye can be used in the dye-donor employed in the invention, provided it is transferable to the dye-receiving layer by the action of heat. Especially good results have been obtained with sublimable dyes. Dye donors applicable for use in the present invention are described, e.g., in U.S. Pat. Nos. 4,916,112; 4,927,803; and 5,023,228. As noted above, dye-donor elements are used to form a dye transfer image. Such a process comprises image-wise-heating a dye-donor element and transferring a dye image to a dye-receiving element as described above to form the dye transfer image. In a preferred embodiment of the thermal dye transfer method of printing, a dye donor element is employed which compromises a poly(ethylene terephthalate) support coated with sequential repeating areas of cyan, magenta, and yellow dye, and the dye transfer steps are sequentially performed for each color to obtain a three-color dye transfer image. When the process is only performed for a single color, then a monochrome dye transfer image is obtained.

Thermal printing heads, which can be used to transfer dye from dye-donor elements to receiving elements of the invention, are available commercially. There can be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal dye transfer may be used, such as lasers as described in, for example, GB No. 2,083,726A.

A thermal dye transfer assemblage of the invention comprises (a) a dye-donor element, and (b) a dye-receiving element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner. A fourth patch on the donor element can be used for a protective overcoat. This overcoat may be applied pattern-wise or over the entire image or dye receiving layer. A typical protective patch can contain a mixture of poly(vinyl acetal) (0.53 g/m2) (Sekisui KS-10), colloidal silica IPA-ST (Nissan Chemical Co.) (0.39 g/m2) and 0.09 g/m2 of divinylbenzene beads (4 µm beads) that was coated from a solvent mixture of diethylketone and isopropyl alcohol (80:20).

The patterning layer preferably comprises an inkjet image. Ink jet printing is a non-impact method for producing images by the deposition of ink droplets in a pixel-by-pixel manner to an image-recording element in response to digital signals. Continuous ink jet and drop-on-demand ink jet are examples of methods that may be utilized to control the deposition of ink droplets on the DRL to yield the desired image. Ink jet printers and media have found broad applications across markets ranging from industrial labeling to optical films to desktop document and pictorial imaging.

An ink jet recording element typically comprises a support having on at least one surface thereof an ink-receiving or image-forming layer (DRL). The ink-receiving layer may be a polymer layer that swells to absorb the ink or a porous layer that imbibes the ink via capillary action.

A binder may also be employed in the image-receiving layer in the invention. In a preferred embodiment, the binder is a hydrophilic polymer. Examples of hydrophilic polymers useful in the invention include poly(vinyl alcohol), polyvinylpyrrolidone, poly(ethyl oxazoline), poly-N-vinylacetamide, non-deionized or deionized Type IV bone gelatin, acid processed ossein gelatin, pig skin gelatin, acetylated gelatin, phthalated gelatin, oxidized gelatin, chitosan, poly(alkylene oxide), sulfonated polyester, partially hydrolyzed poly(vinyl acetate-co-vinyl alcohol), poly(acrylic acid), poly(1-vinylpyrrolidone), poly(sodium styrene sulfonate), poly(2-acrylamido-2-methane sulfonic acid), polyacrylamide or mixtures thereof. In a preferred embodiment of the invention, the binder is gelatin or poly(vinyl alcohol).

If a hydrophilic polymer is used in the image-receiving layer, it may be present in an amount of from about 0.02 to about 30 g/m², preferably from about 0.04 to about 16 g/m² of the image-receiving layer.

Latex polymer particles and/or inorganic oxide particles may also be used as the binder in the DRL to increase the porosity of the layer and improve the dry time. Preferably the latex polymer particles and/or inorganic oxide particles are cationic or neutral. Examples of inorganic oxide particles include barium sulfate, calcium carbonate, clay, silica or alumina, or mixtures thereof. In that case, the weight % of particulate in the image receiving layer is from about 80 to about 95%, preferably from about 85 to about 90%.

The DRL used in the process of the present invention can also contain various known additives, including matting agents such as titanium dioxide, zinc oxide, silica and polymeric beads such as crosslinked poly(methyl methacrylate) or polystyrene beads for the purposes of contributing to the non-blocking characteristics and to control the smudge resistance thereof; surfactants such as non-ionic, hydrocarbon or fluorocarbon surfactants or cationic surfactants, such as quaternary ammonium salts; fluorescent dyes; pH controllers; anti-foaming agents; lubricants; preservatives; viscosity modifiers; dye-fixing agents; waterproofing agents; dispersing agents; UV-absorbing agents; mildew-proofing agents; mordants; antistatic agents, anti-oxidants, optical brighteners, and the like. A hardener may also be added to the ink-receiving layer if desired.

The support for the ink jet recording element can be any of those usually used for ink jet receivers, such as paper, resin-coated paper, polyesters, or microporous materials such as polyethylene polymer-containing material sold by PPG Industries, Inc., Pittsburgh, Pa. under the trade name of Teslin®, Tyvek® synthetic paper (DuPont Corp.), and OPPalyte® films (Mobil Chemical Co.) and other composite films listed in U.S. Pat. No. 5,244,861. Opaque supports include plain paper, coated paper, synthetic paper, photographic paper support, melt-extrusion-coated paper, and laminated paper, such as biaxially oriented support laminates. Biaxially oriented support laminates are described in U.S. Pat. Nos. 5,853,965; 5,866,282; 5,874,205; 5,888,643; 5,888,681; 5,888,683; and 5,888,714, the disclosures of which are hereby incorporated by reference. These biaxially oriented supports include a paper base and a biaxially oriented polyolefin sheet, typically polypropylene, laminated to one or both sides of the paper base. Transparent supports include glass, cellulose derivatives, e.g., a cellulose ester, cellulose triacetate, cellulose diacetate, cellulose acetate propionate, cellulose acetate butyrate; polyesters, such as poly(ethylene terephthalate), poly(ethylene naphthalate), poly(1,4-cyclohexanedimethylene terephthalate), poly (butylene terephthalate), and copolymers thereof; polyimides; polyamides; polycarbonates; polystyrene; polyolefins, such as polyethylene or polypropylene; polysulfones; polyacrylates; polyetherimides; and mixtures thereof. The papers listed above include a broad range of papers, from high end papers, such as photographic paper to low end papers, such as newsprint.

In order to improve the adhesion of the DRL to the support, the surface of the support may be subjected to a corona-discharge-treatment prior to applying the DRL. In addition, a subbing layer, such as a layer formed from a halogenated phenol or a partially hydrolyzed vinyl chloride-vinyl acetate copolymer can be applied to the surface of the support to increase adhesion of the DRL. If a subbing layer is used, it should have a thickness (i.e., a dry coat thickness) of less than about 2 μm.

The indicator element with a light input area on the edge of the indicator is preferred. In this orientation, the light enters the side of the indicator element in the light guiding layer and propagates through the indicator. A more collimated light source would be more efficient. The set up of the system in one arrangement would have a disk indicator with a culminated light source positioned in a stationary position at the edge of the indicator and the detector located on the patterned layer side of the indicator. As the indicator spins, light is constantly introduced and waveguided through the indicator element. This orientation allows the light source to be located next to the indicator instead of in front of or behind the indicator element allowing the timing device to be used in different applications.

Having a collimated light source is preferred so that the light can enter the indicator at a specific area or layer. Furthermore, using a collimated source reduces the misdirected light (that a lamberian light source would have a larger percentage of) that could interfere with the detectors.

Preferably, the indicator has more than one sensors, or detectors. Preferably, the patterning layer is provided with areas without color that are adapted to be read by multiple sensors. Having multiple sensors can increase the accuracy of the device and could allow for more than one measurement at once. Preferably, the light exiting the patterning layer is detected in more than one location. For example, if the indicator was a disk, the outside area with respect to radius could measure one measurement and an inside track, read by a different detector, could be detecting a different measurement.

The light input area, meaning the area of the indicator where light is accepted into the waveguide, can be located anywhere on the indicator. It is preferred to be on the waveguide or the patterned layer. If the light input area is in the patterned layer, it is typically an unpatterned region so that light can pass through the patterned layer into the light guide. The light input area may also be part of the waveguide, for example, light may be inputted into the indicator element through the side of the waveguide. This ability to have a light input area in multiple places on the indicator element enabling a very flexible setup of the timing device.

Preferably, the light guiding layer comprises a colorant. When light (either white or colored) is applied to the light input area it is guided through the light guiding layer and is colored by the color in the light guide layer. For example, if white light is applied to the light input area and the light guiding layer is blue colored then the light exiting the light guiding layer will be blue. The light guiding layer preferably comprises dye or pigment because they have excellent color reproduction and color stability. Dyes and pigments are able to create a large color gamut and saturation. Furthermore, they are easily incorporated into extrusions and coatings. Nano-sized pigments can also be used; with the advantage that less of the pigment is needed to achieve the same color saturation because the pigment particles surface area to volume ratios are so large they are more efficient at adding color. The coloration of the light exiting the light guiding layer can be used in the detecting system to make it more efficient or accurate.

The light guiding layer preferably further comprises fluorescent or phosphorescent materials. As light passes through the light guiding layer the florescent and phosphorescent materials will "glow". The phosphorescent materials will continue to glow for a specified time after the light has removed. A typical fluorescent material is BLANCOPHOR SOL from Bayer/USA. Phosphorescent materials comprise phosphorescent pigments that are available in various colors including blue, green, yellow, orange, and red. The most common phosphorescent pigment is yellowish-green, which is brightest to the human eye, and has a wave length of about 530 nanometers. This pigment is composed of a copper-doped zinc sulfide. A phosphorescent pigment can remain visible in the dark for up to four hours and longer, depending on the source and intensity of excitation energy, the dark adaptation of the eyes, ambient light, and area of and distance from the phosphorescence, as well as other factors. A high ultraviolet (UV) source of energy is considered most effective as an excitation source, although virtually any light is effective at stimulating phosphorescence at some level.

In providing a fluorescent or phosphorescent pigment in a form in which it can be coated or onto a substrate, the pigments are dispersed in a binding medium that must be substantially transparent and, in fact, should be of a high transparency. The particular binding medium can be selected by the skilled artisan depending on the material to be coated or in which the phosphorescent material is to be blended. Zinc Sulfide and Strontium Aluminate are two common phosphorescent materials.

In another preferred embodiment if the invention, the cladding layer comprises a pattern. In the case of a polymer or specular reflecting layer it means that there are discontinuities in the layer and that light can exit through the patterned layer or the cladding layer. Patterning of the specular reflecting layer can be accomplished by methods known in the art such as laser ablation of metal, photolithography, and masking desired areas with release chemistry. Patterning of the specular reflecting layer provides a timing device that can be both reflective and transmissive. Further, two indicator patterns can be used on the timing device, one that is resident in the patterned specular reflecting layer and the second in the light sensitive silver halide layer. Patterning the plastic cladding layer can be accomplished by selective coating of the polymer, vapor or chemical deposition using a mask, or ablation of the polymer layer.

When the light guiding layer is surrounded by a patterned layer on one side and a cladding layer with a pattern on the other side, this enables the illumination of both sides of the indicator device when a light is applied to the light input area. Furthermore, the openings in the metallic reflective layers or discontinuities in the polymer cladding layer could be registration with the patterning layer.

Preferably, additional layers are added to the indicator element to add extra utility. Such layers might contain tints, antistatic materials, or an optical brightener. An optical brightener is substantially colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1-4-Bis (O-Cyanostyryl) Benzol and 2-Amino-4-Methyl Phenol. Optical brightener can be used in a skin layer leading to more efficient use of the optical brightener.

The layers in the indicator element may be coated or treated with any number of coatings which may be used to improve the properties of the sheets including printability, to provide a vapor barrier, to make them heat sealable, or to improve adhesion. Examples of this would be acrylic coatings for printability, coating polyvinylidene chloride for heat seal properties. Further examples include flame, plasma or corona discharge treatment to improve printability or adhesion. The validation device of the present invention may be used in combination with a film or sheet made of a transparent polymer. Examples of such polymer are polyesters such as polycarbonate, polyethylene terephthalate, polybutylene terephthalate and polyethylene naphthalate, acrylic polymers such as polymethyl methacrylate, and polyethylene, polypropylene, polystyrene, polyvinyl chloride, polyether sulfone, polysulfone, polyarylate and triacetyl cellulose.

The indicator element of the invention may also be used in conjunction with a light diffuser, for example a bulk diffuser, a lenticular layer, a beaded layer, a surface diffuser, a holographic diffuser, a micro-structured diffuser, another lens array, or various combinations thereof. The validation device may also be used in an application with more than one sheet of the light management film stacked, or with any other optical film including brightness enhancement films, retroreflective films, waveguides, and diffusers. For the base of the invention, subbing layers are preferred to improve adhesion between the transparent polymer layer and the light sensitive silver halide imaging layers of the invention and the cladding layer to the light guiding layer. For cellulose triacetate gelatin nitrate is preferred as a subbing layer to promote adhesion between the imaging layers and the transparent polymer. For poly(ethylene naphthalate) (PEN) and Poly(ethylene terephthalate) (PET), subbing materials disclosed in U.S. Pat. No. 5,639,589 have been shown to provide excellent adhesion. A preferred subbing layer comprises a mixture of gelatin and vinyl monomer because it provides excellent adhesion and is substantially transparent. For PET, subbing materials disclosed in U.S. Pat. No. 3,501,301 has been shown to provide excellent adhesion and generally are substantially transparent.

In a preferred embodiment of the invention, the subbing layer has substantially the same index of refraction as the transparent polymer layer. By index of refraction matching the subbing layer to the transparent polymer layer, unwanted reflection from the subbing layer is substantially reduced thereby increasing the signal to noise ratio of the emitted/detector utilizing for reflective encoders. An index of refraction difference between the transparent polymer sheet and the subbing layer within 0.05 is preferred. A difference less than 0.05 has been shown to improve the signal to noise ratio by 2% compared to an index of refraction difference of 0.12.

To further protect the pattern layer, an environmental protection layer or overcoat layer is preferred. The environmental protection layer protects the delicate indicator pattern and reduces the rate of moisture flow in and out of the gelatin binder utilized as a binder for the silver halide imaging layer. The protective overcoat layer may consist of suitable material that protects the image from environmental solvents, resists scratching, and does not interfere with the light transmission quality. The protective overcoat layer is preferably applied to the conductive material in either a uniform coating or a pattern wise coating. In a preferred embodiment of the invention the protective overcoat is applied in the presence of an electric field and fused to the topmost layer causing the transparent polymer particles to form a continuous polymeric layer. An electrophotographic toner applied polymer is preferred, as it is an effective way to provide a thin layer.

In another embodiment, the protective overcoat layer is coatable from aqueous solution and forms a continuous, water-impermeable protective layer in a post-process fusing step. The protective overcoat layer is preferably formed by coating polymer beads or particles of 0.1 to 50 μm in average size together with a polymer latex binder on the emulsion side of a sensitized photographic product. Optionally, a small amount of water-soluble coating aids (viscosifiers, surfactants) can be included in the layer, as long as they leach out of the coating during processing. After coating the sheet is treated in such a way as to cause fusing and coalescence of the coated polymer beads, by heat and/or pressure (fusing), solvent treatment, or other means so as to form the desired continuous, water impermeable protective layer.

Examples of suitable polymers from which the polymer particles used in protective overcoat layer can be selected include poly(vinyl chloride), poly(vinylidene chloride), poly (vinyl chloride-co-vinylidene chloride), chlorinated polypropylene, poly(vinyl chloride-co-vinyl acetate), poly (vinyl chloride-co-vinyl acetate-co-maleic anhydride), ethyl cellulose, nitrocellulose, poly(acrylic acid) esters, linseed oil-modified alkyd resins, rosin-modified alkyd resins, phenol-modified alkyd resins, phenolic resins, polyesters, poly (vinyl butyral), polyisocyanate resins, polyurethanes, poly (vinyl acetate), polyamides, chroman resins, dammar gum, ketone resins, maleic acid resins, vinyl polymers, such as polystyrene and polyvinyltoluene or copolymer of vinyl polymers with methacrylates or acrylates, poly(tetrafluoroethylene-hexafluoropropylene), low-molecular weight polyethylene, phenol-modified pentaerythritol esters, poly(styrene-co-indene-co-acrylonitrile), poly(styrene-co-indene), poly(styrene-co-acrylonitrile), poly(styrene-co-butadiene), poly(stearyl methacrylate) blended with poly(methyl methacrylate), copolymers with siloxanes and polyalkenes. These polymers can be used either alone or in combination. In a preferred embodiment of the invention, the polymer comprises a polyester or poly(styrene-co-butyl acrylate). Preferred polyesters are based on ethoxylated and/or propoxylated bisphenol A and one or more of terephthalic acid, dodecenylsuccinic acid and fumaric acid.

To increase the abrasion resistance of the protective overcoat layer, polymers which are cross-linked or branched can be used. For example, poly(styrene-co-indene-co-divinylbenzene), poly(styrene-co-acrylonitrile-co-divinylbenzene), or poly(styrene-co-butadiene-co-divinylbenzene) can be used.

The polymer particles for the protective overcoat layer should be transparent, and are preferably colorless. But it is specifically contemplated that the polymer particle can have some color for the purposes of color correction, or for special effects. Thus, there can be incorporated into the polymer particle dye which will impart color. In addition, additives can be incorporated into the polymer particle which will give to the overcoat desired properties. For example, a UV absorber can be incorporated into the polymer particle to make the overcoat UV absorptive, thus protecting the sheet from UV induced fading or blue tint can be incorporated into the polymer particle to offset the native yellowness of the gelatin used in the gelatin salt conductive material.

In addition to the polymer particles that form the protective overcoat layer, there can be combined with the polymer composition other particles which will modify the surface characteristics of the element. Such particle are solid and nonfusible at the conditions under which the polymer particles are fused, and include inorganic particles, like silica, and organic particles, like methylmethacrylate beads, which will not melt during the fusing step and which will impart surface roughness to the overcoat.

The surface characteristics of the protective overcoat layer are in large part dependent upon the physical characteristics of the polymer which forms the toner and the presence or absence of solid, nonfusible particles. However, the surface characteristics of the overcoat also can be modified by the conditions under which the surface is fused. For example, the surface characteristics of the fusing member that is used to fuse the toner to form the continuous overcoat layer can be selected to impart a desired degree of smoothness, texture or pattern to the surface of the element. Thus, a highly smooth fusing member will give a glossy surface to the imaged element, a textured fusing member will give a matte or otherwise textured surface to the element, a patterned fusing member will apply a pattern to the surface of the article.

Suitable examples of the polymer latex binder include a latex copolymer of butyl acrylate, 2-acrylamido-2-methylpropanesulfonate, and acetoacetoxyethylmethacrylate. Other latex polymers which are useful include polymers having a 20 to 10,000 nm diameter and a Tg of less than 60° C. suspended in water as a colloidal suspension.

Examples of suitable coating aids for the protective overcoat layer include any water soluble polymer or other material that imparts appreciable viscosity to the coating suspension, such as high MW polysaccharide derivatives (e.g. xanthan gum, guar gum, gum acacia, Keltrol (an anionic polysaccharide supplied by Merck and Co., Inc.) high MW polyvinyl alcohol, carboxymethylcellulose, hydroxyethylcellulose, polyacrylic acid and its salts, polyacrylamide, etc). Surfactants include any surface active material that will lower the surface tension of the coating preparation sufficiently to prevent edge-withdrawal, repellencies, and other coating defects. These include alkyloxy- or alkylphenoxypolyether or polyglycidol derivatives and their sulfates, such as nonylphenoxypoly(glycidol) available from Olin Matheson Corporation or sodium octylphenoxypoly(ethyleneoxide) sulfate, organic sulfates or sulfonates, such as sodium dodecyl sulfate, sodium dodecyl sulfonate, sodium bis(2-ethylhexyl)sulfosuccinate (Aerosol OT), and alkylcarboxylate salts such as sodium decanoate.

In another embodiment, the application of an ultraviolet polymerizable monomers and oligomers to the indicator element is preferred. UV cure polymers are preferred, as they can easily be applied to the conductive material in both a uniform coating or a patterned coating. Preferred UV cure polymers include aliphatic urethane, allyl methacrylate, ethylene glycol dimethacrylate, polyisocyanate and hydroxyethyl methacrylate. A preferred photoinitiator is benzil dimethyl ketal. The preferred intensity of radiation is between 0.1 and 1.5 milliwatt/cm$^2$. Below 0.05, insufficient crosslinking occurs yielding a protective layer that does not offer sufficient protection for the protection of the conductive materials.

In another embodiment of the invention, the application of a pre-formed polymer layer to the outermost surface of the indicator element form an protective overcoat layer is most preferred. Application of a pre-formed sheet is preferred because pre-formed sheets are tough and durable easily withstanding the environmental solvents and handling forces. Application of the pre-formed polymer sheet is preferable carried out though lamination after image development. An adhesive is applied to either the photographic label or the pre-formed polymer sheet prior to a pressure nip that adheres the two surfaces and eliminates any trapped air that would degrade the quality of the transmitted light.

The pre-formed sheet preferably is an oriented polymer because of the strength and toughness developed in the orientation process. Preferred polymers for the flexible substrate include polyolefins, polyester and nylon. Preferred polyolefins include polypropylene, polyethylene, polymethylpentene, polystyrene, polybutylene, and mixtures thereof. Polyolefin copolymers, including copolymers of propylene and ethylene such as hexene, butene, and octene are also useful. Polypropylene is most preferred, as it is low in cost and has desirable strength and toughness properties required for a pressure sensitive label.

In another embodiment, the application of a synthetic latex to the indicator element to form a protective overcoat layer is preferred. A coating of synthetic latex has been shown to provide an acceptable protective overcoat layer and can be coated in an aqueous solution eliminating exposure to solvents. The coating of latex has been shown to provide an acceptable protective overcoat layer for conductive circuits. Preferred synthetic latexes for the protective overcoat layer are made by emulsion polymerization techniques from styrene butadiene copolymer, acrylate resins, and polyvinyl acetate. The preferred particles size for the synethetic latex ranges from 0.05 to 0.15 μm. The synthetic latex is applied to the outermost layer of the silver halide imaging layers by known coating methods that include rod coating, roll coating and hopper coating. The synthetic latexes must be dried after application and must dry transparent so as not to interfere with the quality of the transmitted light energy.

The following examples illustrate the practice of this invention. They are not intended to be exhaustive of all possible variations of the invention. Parts and percentages are by weight unless otherwise indicated.

EXAMPLES

Example 1

A high contrast waveguided indicator element was made in accordance with the invention by encapsulating a light guiding layer by a patterned layer and a cladding layer. The light guiding layer used was a 100 micrometer polyester (PET) film (from Eastman Kodak Comp.) with an index of refraction of 1.51. The cladding layer, a Teflon® resin (trade name: FEP100-J) having a refractive index of about 1.34 manufactured by Dupont Corp., was extruded onto the polyester light guiding layer in a thickness of approximately 15 micrometers. Silver halide imaging was used to create the patterning layer. To ensure good adhesion of the silver halide layers to the PET film on the side opposite to the cladding, an adhesion layer was added. A latex and gelatin adhesion promoting layer (in an approximately 1:1 ratio and a thickness of 7 micrometers) was applied to anchor the image forming layer. An image forming layer, comprising a high density/high contrast silver chloride black and white emulsion was coated onto the outer surface of the light guiding layer over the adhesion promoting layer. The structure of example 1 was as follows:

Ag patterned layer
Adhesion promoting layer
Light guiding layer
Cladding layer

Example 2

This example incorporated a metallic silver layer with a pattern for the cladding layer and an inkjet patterned layer. The light guiding layer was a polyester film (PET) from Eastman Kodak Comp, with an index of refraction of 1.51. The patterning layer was created by coating a polyvinyl alcohol inkjet receiving layer, 20 micrometers thick on one surface of the PET. An inkjet image of an encoder pattern was printed onto the inkjet receiving layer using a carbon black pigmented ink. The cladding layer was applied to the PET on the side opposite the inkjet receiving layer. The cladding layer was formed using by applying a mask (of an encoder pattern) to the PET and vacuum depositing 1000 angstroms of silver metal onto light guiding layer. The mask was then removed to leave a silver cladding layer with an encoder pattern of metallic and non-metallic areas. The metallic silver had excellent adhesion to the polyester surface and the silver areas of the pattern had a reflectivity of 98% of light at a wavelength of 500 nanometers. To protect the metal from scratching and abrasion, a protective layer of a UV cured polyacylate with an index of refraction of 1.51, to match the index of refraction of the light guiding layer, was applied over the silver cladding layer in a thickness of 5 micrometers. The structure of example 2 is as follows:

Carbon black inkjet pattern layer
Light guiding layer
Patterned silver cladding layer
UV cured polyacrylate The waveguided indicator elements in example 1 and 2 were tested with a collimated light source applied to the edge of the device such that the light entered and propagated through the light guiding layer. In the case of example 1, a detector was placed on the patterning layer side of the element in close proximity to the indicator element and worked well with the detector to form a timing device. The example 2 sample had two detectors, one on the patterning layer side and one on the patterned cladding layer side. When light was applied to the waveguided indicator element, light exited through the non-patterned areas on either side of the element and the two detectors, in close proximity to the element, worked well with the waveguided indicator to form a very precise timing device.

Both the silver halide and the inkjet patterning layers' patterned areas had very high densities, with the silver halide patterned areas having an optical density of 2.68 and the inkjet patterned areas having an optical density of 2.95. Because the detector and the light source were decoupled because of the waveguide, the indicator element could be used in many different configurations and applications where a typical prior art indicator element would not be able to be used.

The invention has been described in detail with particular reference to certain preferred embodiments thereof, but it will be understood that variations and modifications can be effected within the spirit and scope of the invention.

PARTS LIST

1; Indicator element
3; Patterning layer
5; Light guiding layer
7; Cladding layer
11; Indicator element
13; Light
15; Light exiting indicator element
17; Detector
19; Indicator element
21; Light shaping elements
23; Patterning lay
25; Light guiding layer
27; Cladding layer

What is claimed is:

1. An indicator comprising a light-guiding layer, a cladding layer on one surface of said light-guiding layer, and a patterning layer on the other surface, wherein said indicator is in the form of a disk.

2. The indicator of claim 1 wherein said patterning layer comprises areas of generally opaque colorant and areas without colorant.

3. The indicator of claim 2 wherein said patterning layer is provided with areas without color that are adapted to be read by multiple sensors.

4. The indicator of claim 1 wherein said photosensitive silver halide comprises a silver halide emulsion capable of forming a black and white indicia having a density of greater than 2.5.

5. The indicator of claim 4 wherein said silver halide emulsion is capable of forming an image having a contrast between 0.51 and 0.95.

6. The indicator of claim 1 wherein said cladding layer comprises a metal with a reflectivity of at least 95% at 500 nanometers.

7. The indicator of claim 6 wherein said cladding layer comprises a pattern.

8. The indicator of claim 1 wherein said patterning layer comprises a silver halide image.

9. The indicator of claim 1 wherein said light-guiding layer has a thickness of between 100 and 250 micrometers.

10. The indicator of claim 1 wherein said light-guiding layer comprises thermoplastic polymer.

11. The indicator of claim 1 wherein said patterning layer comprises a thermal dye transfer image.

12. The indicator of claim 1 wherein said patterning layer comprises an ink jet image.

13. The indicator of claim 1 wherein said indicator is provided with a light input area at the edge of said indicator.

14. The indicator of claim 1 wherein said indicator is provided with a light input area in the patterning layer or cladding layer.

15. The indicator of claim 1 wherein said light-guiding layer comprises polycarbonate.

16. The indicator of claim 1 wherein said light-guiding layer comprise colorant.

17. The indicator of claim 1 wherein said cladding layer comprises a polymer with an index of refraction of at least 0.05 less than the index of refraction of the light guiding layer.

18. A method of controlling position comprising providing a indicator comprising a light-guiding layer, a cladding layer on one surface of said light-guiding layer, and a patterning layer on the other surface, applying a light source to said indicator, detecting light in said patterning layer as said indicator moves past said light source, and controlling position of a movable device in response to detected light.

19. The indicator of claim 18 wherein said cladding layer comprises a pattern.

20. The indicator of claim 18 wherein said patterning layer comprises areas of generally opaque colorant and areas without colorant.

21. The method of claim 18 wherein said light source comprises a collimated light source.

22. The method of claim 18 wherein detecting light in said patterning layer is carried out in more than one location.

23. The method of claim 18 wherein said applying of a light source to said indicator is at an edge of said indicator.

24. The method of claim 18 herein said indicator is provided with a light input area in the patterning layer or cladding layer.

25. The indicator of claim 18 wherein said cladding layer comprises a polymer with an index of refraction of at least 0.05 less than the index of refraction of the light guiding layer.

26. An indicator comprising a light-guiding layer, a cladding layer on one surface of said light-guiding layer, and a patterning layer on the other surface, wherein said cladding layer comprises a pattern.

27. The indicator of claim 26 wherein said patterning layer comprises an ink jet image.

28. The indicator of claim 26 wherein said cladding layer comprises a metal with a reflectivity of at least 95% at 500 nanometers.

29. The indicator of claim 26 wherein said patterning layer comprises areas of generally opaque colorant and areas without colorant.

30. The indicator of claim 26 wherein said indicator is in the form of a strip.

31. The indicator of claim 26 wherein said patterning layer comprises a silver halide image.

32. An indicator comprising a light-guiding layer, a cladding layer on one surface of said light-guiding layer, and a patterning layer on the other surface, wherein said cladding layer comprises a polymer with an index of refraction of at least 0.05 less than the index of refraction of the light guiding layer.

33. The indicator of claim 32 wherein said patterning layer comprises an ink jet image.

34. The indicator of claim 32 wherein said cladding layer comprises a metal with a reflectivity of at least 95% at 500 nanometers.

35. The indicator of claim 1 wherein said patterning layer comprises areas of generally opaque colorant and areas without colorant.

36. The indicator of claim 32 wherein said indicator is in the form of a strip.

37. The indicator of claim 32 wherein said patterning layer comprises a silver halide image.

* * * * *